Aug. 8, 1933.  R. T. OSMAN ET AL  1,921,537
CUSHION CLEAT WHEEL
Filed Dec. 31, 1930   3 Sheets-Sheet 1
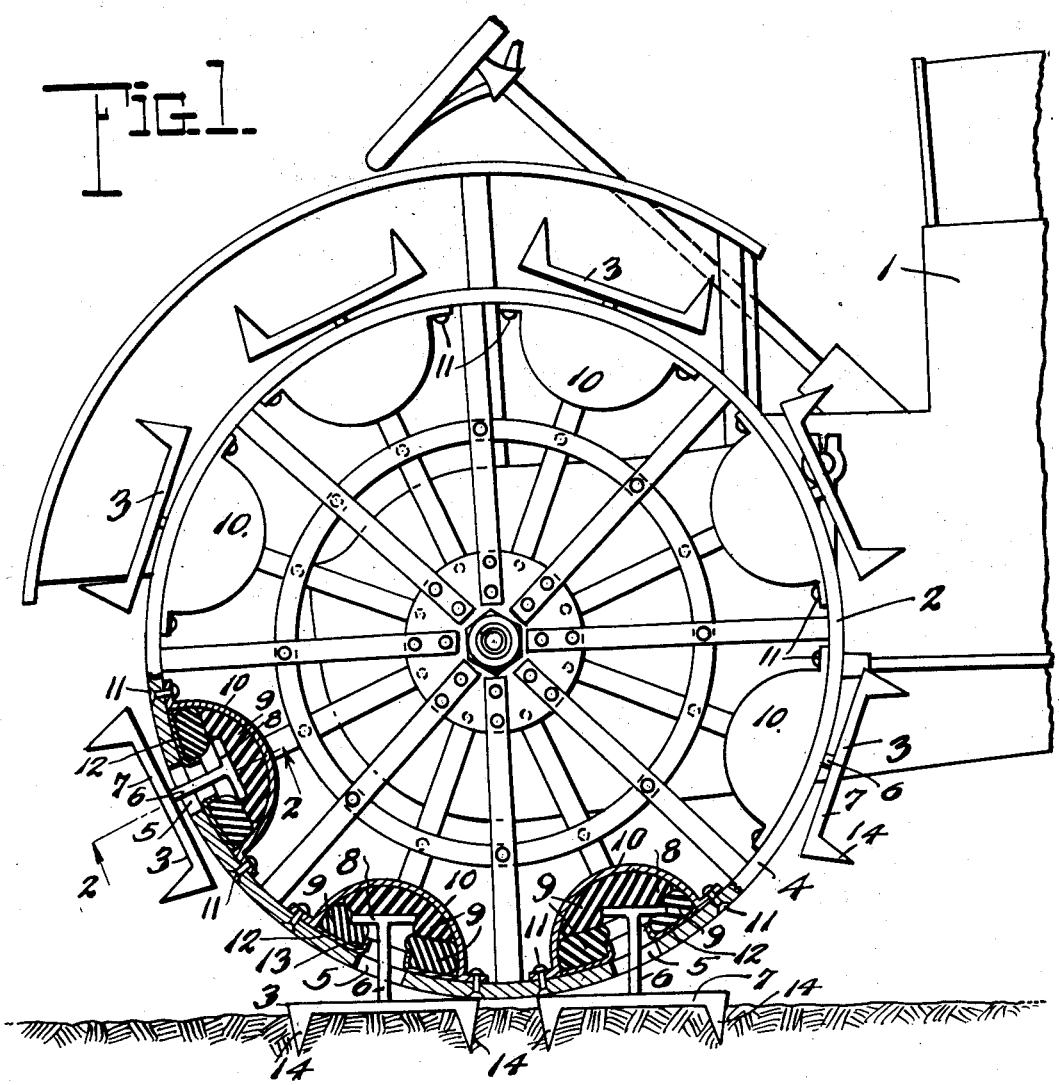
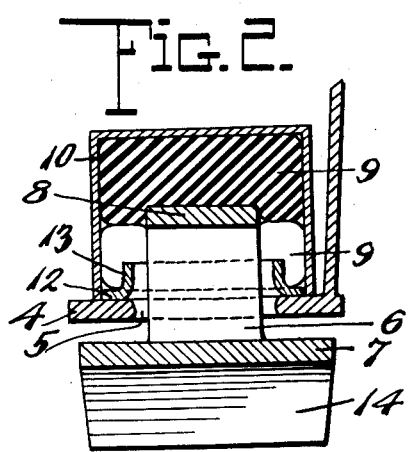
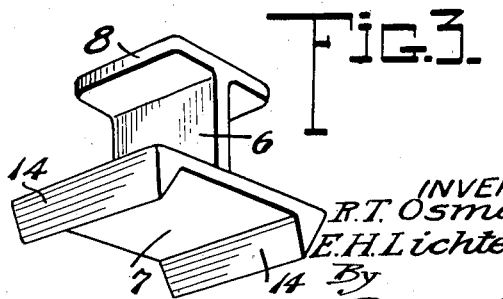
INVENTORS
R. T. Osman
E. H. Lichtenberg
By
Robt X Cobb
ATTORNEYS Aug. 8, 1933. R. T. OSMAN ET AL 1,921,537
CUSHION CLEAT WHEEL
Filed Dec. 31, 1930 3 Sheets-Sheet 2
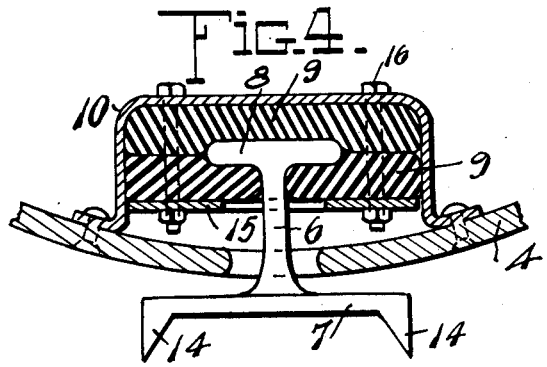
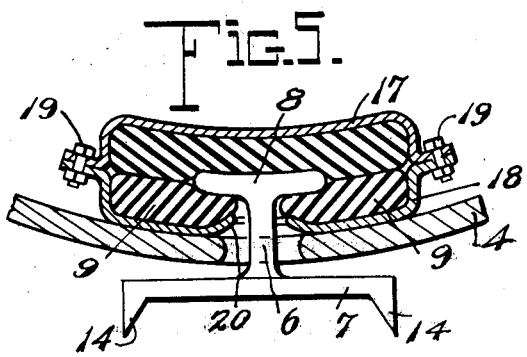
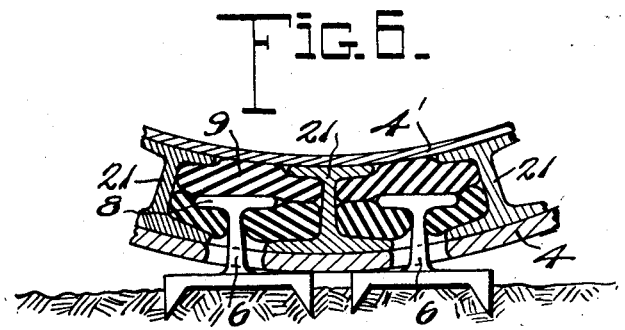
INVENTORS
R. T. Osman
E. H. Lichtenberg
By Robb & Robb
ATTORNEYS

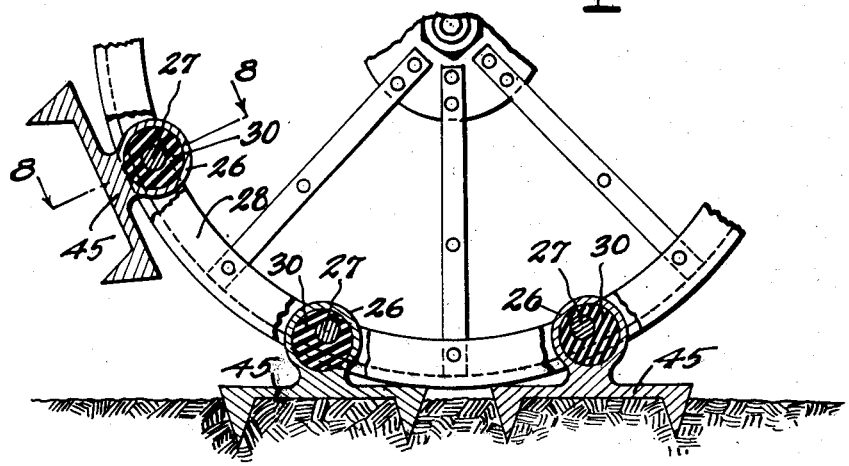
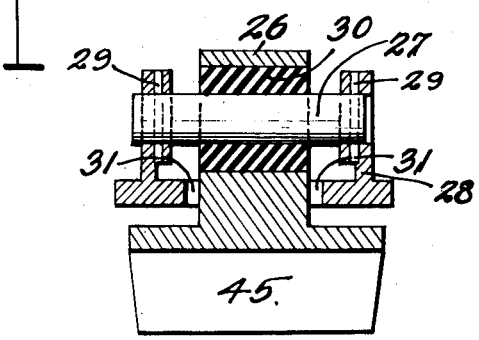

Patented Aug. 8, 1933

1,921,537

UNITED STATES PATENT OFFICE 1,921,537

CUSHION CLEAT WHEEL

Ralph T. Osman and Erich H. Lichtenberg, Milwaukee, Wis., assignors to Koehring Company, Milwaukee, Wis., a Corporation Application December 31, 1930. Serial No. 505,856

14 Claims. (Cl. 305—13)

This invention relates to traction treads and more particularly to attachments for the traction wheels of tractors and similar or analogous machines where considerable tractive effort is required for drawing, pushing, carrying, or otherwise moving heavy loads, said attachments being in the form of cushioned cleats or tread members suitably carried by the wheels.

In machines of this character embodying the crawler principle, it is customary to secure the tread members to the wheels through a loose metallic joint or bearing, such a construction obviously being very noisy in operation and otherwise objectionable in the transmission of shocks and vibrations to the machine as a whole as well as to the associated tread and traction mechanisms.

It is an object of the present invention to utilize the crawler principle of operation without reduction in normal tractor speed while eliminating the shocks and vibrations of the usual pin or other forms of metallic joints between the tread members and traction wheels.

A further object of the invention is to provide the tread members with suitable resilient cushions of rubber or other similar material.

A still further object is to provide resiliently mounted tread members wherein the resilient cushioning material is normally under compression whereby to maintain the said tread members in spaced relation to the traction wheels and at substantially right angles to the respective spokes thereof when the tread members are out of contact with the ground.

Another object of the invention is to provide a construction which has comparatively few parts, is simple in construction, quiet in operation, and may be readily and easily attached to and removed from the wheel.

Other and further objects and advantages of the invention will be hereinafter set forth and the novel features thereof defined by the appended claims.

In the drawings:

Fig. 1 is a fragmentary side elevation of a conventional tractor, showing one form of construction of the tread members and associated cushions as applied to the traction wheels, certain of the parts being broken away and shown in section;

Fig. 2 is a sectional view taken on the line 2—2 of Fig. 1;

Fig. 3 is an enlarged detail perspective view of a tread member or shoe;

Fig. 4 is a fragmentary sectional view of a modified form of cushion construction as applied to the wheel, the tread member being shown in elevation;

Fig. 5 is a fragmentary sectional view of a further modified form of cushion construction as applied to the wheel, the tread member being shown in elevation;

Fig. 6 is a fragmentary sectional view of a still further modified form of construction;

Fig. 7 is a fragmentary side elevation of a traction wheel to which a modified tread member construction is applied, parts being broken away and shown in section; and Fig. 8 is a sectional view taken on the line 8—8 of Fig. 7.

Like reference characters designate corresponding parts in the several figures of the drawings.

Referring to Figs. 1 to 3, 1 denotes generally a conventional tractor or analogous machine having the usual traction wheels 2 to which the tread members or cleats generally designated by 3, are suitably attached. The rims 4 of the traction wheels 2 are preferably provided with apertures 5 therein at intervals about the periphery thereof for receiving a headed shank or rib 6 extending from one face of the shoes or tread members 7, the head being designated by the reference numeral 8. Insertion of the head and shank through the apertures may be accomplished by tilting the tread members so as to insert one side of the head through the aperture, a subsequent tilting in the opposite direction permitting the complete insertion of the head. This action is very similar to the manner of inserting a collar button or analogous fastening means through a button hole.

Located preferably on the inner surface of the wheel rim are resilient cushioning members 9, said cushioning members closely engaging the head 8. The cushioning members are preferably formed in a plurality of sections between certain of which the head 8 is inserted and a cover or casing 10 is placed over the cushioning members and suitably secured to the rim of the wheel by bolts 11, or in any desired manner so as to normally place the cushioning members under compression. A plate 12 having a flange 13 is preferably positioned against the surface of the wheel rim for the purpose of retaining the cushioning members in spaced relation to the shanks 6 of the tread members to permit the same to have free movement in the aperture 5.

It will be observed from Figs. 1 and 2 that the normal compression of the resilient cushioning material, which may be of rubber or other suitable material, causes the cleats or tread members to be normally projected outwardly for a slight distance from the outer surface of the wheel rim when the tread members are out of contact with the ground. In this position, the tread members are also at substantially right angles to the respective spokes of the wheel; that is to say, the shanks 6 normally extend radially of the wheel.

During rotation of the wheels, the tread members will successively engage the ground, and by virtue of the normal spacing of the same from the peripheral surface of the wheels, the shocks produced by the transfer of the weight of the machine onto the tread members and the bringing of the tread members into contact with the wheel incident to such transfer, will be substantially absorbed by the cushioning material, said cushioning material being readily distorted within the casing to permit the substantially flat contact of the tread members with the ground to provide a track on which the wheels are adapted to run. It will be further observed that at least two of the tread members are always in substantially flat contact with the ground as the wheels rotate. If desired, the tread members may be provided with anti-skid projections or lugs 14 which will be self-cleaning owing to the substantially straight lifting action of the tread members during rotation of the wheels, thereby eliminating pushing, packing, or tearing of the soil over which the tractor is driven.

If desired, the tread members and associated cushioning parts may be quickly and readily removed from the wheels to comply with the highway regulations when driving the tractor over hard surfaced highways. However, by virtue of the yieldable construction of the tread members, marking of the hard surfaced road is greatly reduced, if not entirely eliminated.

Fig. 4 shows a modified form of cushion construction wherein the housing 10 is provided with a movable clamping plate 15 and suitable bolts 16 for effecting compression of the cushioning material 9. This construction differs from that shown in Figs. 1 and 2 in that the normal compression of the cushioning material in the former is produced incident to the clamping or securing of the housing to the wheel, whereas in the latter, the compression may be produced independently of the securing of the housing to the wheel.

In Fig. 5, the housing is shown as being formed of complemental sections 17 and 18 secured together by bolts 19. The housing unit may then be secured to the wheel in any desired manner, the section next to the rim being preferably provided with an inwardly turned flange 20 for retaining the cushioning members.

A still further modified form of construction is shown in Fig. 6, the wheel being provided with a supplemental rim 4' in spaced relation to the usual rim and located within the same, between which spaced rims are secured transverse I-beam or channel member sections 21 at desired intervals. The spaced rims and transverse members thereby constitute a housing for the cushioning members 9.

Figs. 7 and 8 illustrate another modified form of tread member construction wherein the tread member 45 is provided at one side with an enclosing shell or casing 26 which is adapted to receive a pin 27 extending therethrough transversely of the traction wheel 28, the pin being fixed to the traction wheel in any suitable manner, as by means of pins 29. The shell extends through a slot or aperture 31 in the rim which is of sufficient size to permit the tread member to assume various angular positions as the traction wheel rolls over the same. Located intermediate the inner face of the shell 26 and the pin 27 is a sleeve 30 formed of suitable resilient material, said sleeve being preferably secured both to the pin 27 and the casing 26 to prevent free rotation of the sleeve with respect to the pin and shell. If desired, the securing of the sleeve to the pin and shell may be by vulcanizing.

It will be observed that in this form of construction, the tread members are also normally maintained in spaced relation to the traction wheel until brought into contact with the ground incident to rotation of the wheel, whereupon the tread members form a track over which the traction wheel runs. The joint thus formed in connecting the tread members to the traction wheel is readily flexed by the deformation of the sleeve 30 to accommodate the various angular positions of the tread members which they assume in the rotation of the wheel. Quiet operation and absorbing of shocks is also attained, as in the other forms of the invention. Likewise, the simplicity of construction and the small number of parts greatly facilitate the attachment or removal of the tread members. A substantially universal joint is thus provided in the cushioning of the tread member with respect to the pin by the resilient sleeve.

The operation of the tread members should be readily apparent from the foregoing description with respect to the construction in Figs. 1 to 3, it being understood that the principle of operation is the same in all the various forms.

While the specific details of construction have been herein shown and described, the invention is not confined thereto as changes and alterations may be made without departing from the spirit thereof as defined by the appended claims.

Having thus described our invention, what we claim as new and desire to secure by Letters Patent is:

1. An attachment for a traction wheel comprising a tread member having a shank extending loosely through the rim of the wheel, a head formed on said shank, a resilient cushion enclosing said head, and a casing adapted to be secured to the rim for maintaining said cushion in position, said casing normally placing said cushion under compression.

2. The combination with a traction wheel having apertures in the rim at intervals about the periphery thereof, of tread members having shanks extending through said apertures, said shanks having heads formed at the inward extremities thereof and being comparatively smaller than said apertures so as to permit of relative movement of the tread members circumferentially of the rim incident to rotation of the wheel, and cushioning means engaging said heads for resiliently restricting the movements of said tread members.

3. The combination with a traction wheel, of track forming tread members having projections embedded in rubber and constituting universal connections with said wheel.

4. The combination with a traction wheel, of tread members flexibly connected therewith and disposed about the periphery thereof whereby to provide a self-laying track, said tread members having shanks extending through the rim of said wheel and enlarged heads on the inward extremities of the shanks, cushioning means for said tread members, said cushioning means being composed of a plurality of sections of rubber between certain of which said heads are interposed, and means for normally compressing said rubber sections.

5. An attachment for traction wheels comprising a tread member having a yieldable connection with said wheel, a pin extending transversely of and rigidly secured to said wheel adjacent to the periphery thereof, an enclosing shell formed on one side of said tread member for receiving the pin therethrough, said shell extending loosely through the rim of the wheel, and a resilient sleeve intermediate said pin and shell.

6. An attachment for traction wheels comprising a tread member having a yieldable connection with said wheel, a pin extending transversely of and rigidly secured to said wheel adjacent to the periphery thereof, an enclosing shell formed on one side of said tread member for receiving the pin therethrough, said shell extending loosely through the rim of the wheel, and a resilient sleeve intermediate said pin and shell, said sleeve being secured to said pin and shell whereby to resist relative movement of the engaging surfaces of the sleeve with respect to the pin and shell.

7. The combination with a traction member having a plurality of openings circumferentially disposed therein, tread members carried by the traction member and normally spaced therefrom, each of the tread members comprising a ground engaging portion and a projection integral with the ground engaging portion and loosely extending into the said openings for universal movement of the ground engaging portion and projection relative to the traction member, and a cushioning body of resilient material interposed between each projection and the outer periphery of the traction member.

8. The combination with a traction member having a plurality of openings circumferentially disposed therein, tread members carried by the traction member and normally spaced therefrom, each of the tread members comprising a ground engaging portion and a projection loosely extending into the said openings for universal movement of the ground engaging portion and projection relative to the traction member, and cushioning means intermediate a portion of the traction member and the said projection to cushion the tread member in its movements.

9. An attachment for a traction wheel, comprising a radially movable tread member having a shank extending loosely through the rim of the wheel, a head formed on the shank, resilient cushioning means surrounding the head for cushioning the tread member in both inward and outward radial movements of the tread member, and means for maintaining the cushion in position.

10. An attachment for a traction wheel, comprising a radially and circumferentially movable tread member having a shank extending loosely through the rim of the wheel, a head formed on the shank, a resilient cushion enclosing the head while allowing universal movement thereof and constituting cushioning means for the tread member in both inward and outward radial movements of the tread member, and a casing adapted to be secured to the inner side of the rim for maintaining the cushion in position.

11. An attachment for traction wheels comprising a tread member composed of a substantially flat piece of material having an integral shank extending from one surface thereof intermediate the ends and substantially perpendicular thereto, a housing substantially enclosing said shank, the shank being provided with an integral flat head at the extremity of the same, the head extending substantially parallel to the flat piece of material aforesaid, and cushioning means embedding the head end of the shank and allowing free universal movement of the tread member.

12. The combination with a traction member, of tread members carried thereby and normally spaced therefrom, each of the tread members having a projection extending loosely through the traction member and a yieldable connection between the projection and traction member permitting universal movement of the tread member and cushioning the tread member during said movement, said yieldable connection comprising cushioning means interposed between the projection and the traction member, the projection being substantially surrounded by the cushioning means.

13. An attachment for a traction wheel comprising a tread member having a shank extending loosely through the rim of the wheel, a housing around the shank, a head formed on the shank, and a resilient sectional cushion within the housing and engaging the head, the cushion being disposed between the head and housing and between the head and traction wheel, the housing maintaining the cushion means in position.

14. The combination with a wheel of tread members having a portion extending into the wheel making a loose connection therewith, the connection including cushioning means for the tread members carried by the wheel, the cushioning means comprising a plurality of layers of resilient material, the said extending portion of the tread members being interposed between the layers.

RALPH T. OSMAN.
ERICH H. LICHTENBERG.